United States Patent Office 3,433,810
Patented Mar. 18, 1969

3,433,810
1-AMINO(OR HYDROXY)-4-PHENYLUREIDO-ANTHRAQUINONES
Hans Rudolf Rickenbacher, Basel, Switzerland, assignor to Ciba Limited, Basel, Switzerland, a company of Switzerland
No Drawing. Filed Nov. 30, 1965, Ser. No. 510,685
Claims priority, application Switzerland, Dec. 4, 1964, 15,745/64; Apr. 15, 1965, 5,304/65
U.S. Cl. 260—377
Int. Cl. C09b 1/36, 1/16
6 Claims

ABSTRACT OF THE DISCLOSURE 1-amino-4-phenylureido-anthraquinones substituted at the 2-position are valuable disperse dyestuffs of the anthraquinone series with excellent affinity for hydrophobic fibers and providing dyeings with excellent fastness to light and sublimation.

---

The present invention is based on the observation that valuable disperse dyestuffs of the anthraquinone series which contains an alkyl-, cycloalkyl-, aralkyl- or arylureido group in an α-position are obtainable when an α-aminoanthraquinone is reacted with an alkyl-, cycloalkyl-, aralkyl- or aryl-isocyanate.

The starting materials used are preferably aminoanthraquinones of the formula

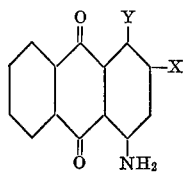

in which X represents a halogen atom, an alkyl, alkoxy, aryloxy, alkylmercapto, arylmercapto, phenyl, acyl, nitro or cyano group and Y represents a hydrogen or halogen atom, a hydroxyl, alkoxy, amino or nitro group.

As examples there may be mentioned:

1-aminoanthraquinone,
1-amino-4-chloranthraquinone,
1-amino-5-chloranthraquinone,
1-amino-6- or -7-chloranthraquinone,
1-amino-2,4-dichloranthraquinone,
1-amino-6,7-dichloranthraquinone,
1,4-diaminoanthraquinone,
1,4-diamino-2-chloranthraquinone,
1,4-diamino-2-bromanthraquinone,
1,4-dimano-2-methoxyanthraquinone,
1,4-diamino-2-methylanthraquinone,
1,4-diamino-2-ethoxyanthraquinone,
1,4-diamino-2,β-hydroxyethoxyanthraquinone,
1,4-diamino-2-phenoxyanthraquinone,
1,4-diamino-2-methylmercaptoanthraquinone,
1,4-diamino-2-phenylmercaptoanthraquinone,
1,4-diamino-2-phenylanthraquinone,
1,4-diamino-2-acetylanthraquinone,
1,4-diamino-2-benzoylanthraquinone,
1,4-diamino-2-nitroanthraquinone,
1,4-diamino-2-cyanoanthraquinone,
1-amino-4-hydroxyanthraquinone,
1-amino-5,8-dihydroxyanthraquinone,
1,5-diamino-4,8-dihydroxyanthraquinone,
1,8-diamino-4,5-dihydroxyanthraquinone,
1,5-diamino-2-bromo-4,8-dihydroxyanthraquinone,
1,5-diamino-2-(para-hydroxyphenyl)-4,8-dihydroxyanthraquinone,
1,4-diamino-5-nitroanthraquinone,
1,4-diamino-2-bromo-5- or -8-nitroanthraquinone,
4-aminoanthraquinone-2,1(N)-benzacridone and
1,5-dihydroxy-4-amino-8-nitroanthraquinone.

Alkylisocyanates that may be used are, for example, ethyl-, propyl-, isopropyl-, butyl-, isobutyl-, amyl-, hexyl- and octyl-isocyanate; cyclohexylisocyanate may be mentioned as a cycloalkylisocyanate and benzylisocyanate as an aralkylisocyanate. Arylisocyanates that may be mentioned are the naphthylisocyanates, but, in particular, the phenylisocyanates. These may also be substituted in the phenyl residue, for example, by halogen atoms or alkyl, alkoxy or nitro groups. The following arylisocyanate may be mentioned as examples: phenylisocyanate, 4-nitrophenylisocyanate, 2-, 3- or 4-methylphenylisocyanate, 2-, 3- or 4-chlorophenylisocyanate, 2-, 3- or 4-methoxyphenylisocyanate, 2,4- or 2,5-dimethylphenylisocyanate, 2,4- or 2,5-dimethoxyphenylisocyanate, 2,3- or 3,4-dichlorophenylisocyanate and 1- or 2-naphthylisocyanate.

The reaction is advantageously carried out in an inert organic solvent, for example, chlorobenzene, ortho-dichlorobenzene, nitrobenzene or pyridine, preferably at an elevated temperature. In view of the fact that the isocyanates are highly reactive it is most desirable that water be absent during the reaction.

The new ureidoanthraquinones, especially those of the formula

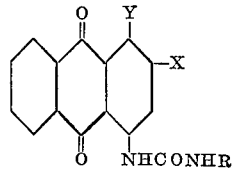

in which R represents an alkyl, cycloalkyl, benzyl or phenyl residue and X and Y have the meanings given above, are valuable dyestuffs displaying an excellent affinity for hydrophobic fibres, for example, fibres made from cellulose acetate (the so-called 2½ acetate), cellulose triacetate, polyamides and especially aromatic polyesters. The dyeings obtained exhibit an excellent fastness to light and to sublimation.

Compared with the 1-amino-2-alkoxy-4-anthraquinonyl-urethanes described in U.S. patent specification No. 2,967,871, the dyestuffs obtainable by the process of the present invention possess an improved fastness to sublimation and affinity for nylon, and compared with the analogous benzoyl compounds described in French patent specification No. 1,335,829 they have an advantage in that they produce good dyeings on polyester fibres by the carrier process.

In the dyeing process, the new dyestuffs are advantageously applied in a state of fine division and in the presence of a dispersing agent, for example, soap, sulphite cellulose waste liquor or a synthetic detergent or in the presence of a combination of different wetting and dispersing agents. Prior to dyeing, it is generally advantageous to convert the dyestuffs into dyeing preparations that contain a dispersing agent and the finely divided dyestuff in a form such that a fine dispersion is formed when the preparations are diluted with water. Dyestuff preparations of the kind defined can be made in known manner, for example, by reprecipitating the dyestuff from a solution in sulphuric acid and grinding the slurry so obtained together with sulphite cellulose waste liquor or, if desired, by grinding the dyestuff in a highly efficient grinding device in the dry or wet state in the presence or absence of a dispersing agent.

In order to obtain stronger dyeings on polyethylene terephthalate fibres it has been found to be advantageous to add a swelling agent to the dyebath or, in particular, to carry out the dyeing process under superatmospheric pressure at a temperature above 100° C. for example, 120° C. Suitable swelling agents are aromatic carboxylic acids, for example, benzoic acid or salicylic acid, phenols, for example, ortho- or para-hydroxydiphenyl, aromatic halogen compounds, for example, chlorobenzene, orthodichlorobenzene or trichlorobenzene, phenylmethylcarbinol or diphenyl. When dyeing under superatmospheric pressure it is advantageous to render the dyebath slightly acid, for example, by the addition of a weak acid, for example, acetic acid.

Those new dyestuffs that do not contain phenolic hydroxyl groups are also suitable for application by the so-called thermofixation process because of their fastness to alkali. In the thermofixation process the fabric to be dyed is impregnated, preferably at a temperature not exceeding 60° C., with an aqueous dispersion of the dyestuff which advantageously contains 1 to 50% of urea and a thickening agent, especially sodium alginate, and then squeezed in the usual manner. The fabric is advantageously squeezed in a manner such that it retains 50 to 100% of its dry weight of dye-liquor.

To bring about fixation of the dyestuff, the fabric so impregnated is heated to a temperature above 100° C., for example, to a temperature between 180 and 220° C., advantageously after having been dried, for example, in a current of hot air.

The above-mentioned thermofixation process is of special interest in the dyeing of union fabrics made from polyester fibres and cellulosic fibres, especially cotton. In this case, the padding liquor contains, in addition to the dyestuffs of the invention, dyestuffs that are suitable for dyeing cotton, especially vat dyestuffs or reactive dyestuffs, that is to say, dyestuffs that can be fixed on the cellulosic fibre by means of a chemical bond, for example, dyestuffs containing a chlorotriazine or chlorodiazine residue. In the latter case, it is advantageous to add an agent capable of binding acid to the padding solution, for example, an alkali metal carbonate or an alkali metal phosphate, an alkali metal borate or an alkali metal perborate, or mixtures thereof. When using vat dyestuffs it is necessary to subject the padded fabric to a treatment with an aqueous alkaline solution of a reducing agent commonly used in vat dyeing after the fabric has been heat-treated.

Because they reserve wool well, the dyestuffs of the invention are eminently suitable for dyeing union fabrics made from polyester fibres and wool.

The dyeings obtained are advantageously subjected to an after-treatment, for example, by heating with an aqueous solution of a non-ionic detergent.

The dyestuffs can also be applied by printing techniques. To this end there is used, for example, a printing paste that contains the finely divided dyestuff, together with the usual printing adjuvants, for example, wetting and thickening agents, if desired, in admixture with one of the above-mentioned cotton dyestuffs, if necessary, in the presence of urea and/or an agent capable of binding acid.

The following examples illustrate the invention. Unless otherwise stated, the parts and percentages are by weight.

EXAMPLE 1

A mixture of 360 parts of pyridine, 50 parts of benzene and 23.9 parts of 1-amino-4-hydroxyanthraquinone is heated in a glass apparatus provided with a stirrer, a thermometer, a dropping funnel and a descending condenser. Any water that may be present is removed azeotropically by distilling off about 60 parts of the solvent mixture at 95 to 110° C. The descending condenser is replaced by a reflux condenser and 12.1 parts of phenylisocyanate are added dropwise in the course of 30 minutes, the mixture being stirred at 80 to 85° C. The mixture is kept at 80 to 85° C. for one hour, whereupon it is allowed to cool and is then suction-filtered. The press cake is washed successively with 60 parts of pyridine and 100 parts of a 1:1 mixture of pyridine and water and then dried. The dyestuff is obtained in the form of a bright red powder in a yield of 24.5 parts. The nitrogen content is 8.07%, the calculated amount for 1-hydroxy-4-phenylureido-anthraquinone being 7.82%. When applied in the form of an aqueous dispersion the dyestuff dyes fibers made from polyethylene terephthalate red tints possessing a good fastness to light and to sublimiation.

By using p-methylphenylisocyanate or m-methoxyphenylisocyanate instead of phenylisocyanate dyestuffs with similar properties are obtained.

EXAMPLE 2

A mixture of 360 parts of pyridine, 50 parts of benzene and 26.8 parts of 1,4-diamino-2-methoxyanthraquinone is dehydrated azeotropically as described in Example 1. 12.1 parts of phenylisocyanate are added and the mixture is stirred for one hour at 80 to 85° C. The dyestuff is precipitated from the solution while it is still hot by addition of 1,000 parts of water and is isolated by filtration at room temperature. 35 parts of a bluish red powder having a nitrogen content of 10.48% are obtained. The nitrogen content calculated for 1-amino-2-methoxy-4-phenylureidoanthraquinone is 10.84%. When applied in the form of an aqueous dispersion the dyestuff gives strong ruby tint on polyethylene terephthalate fibres and fibres made from nylon and cellulose acetate. The dyeings possess very good fastness to light and sublimation and the wool content in union fabrics is very well reserved. It is also suitable for dyeing union fabrics made from polyethylene terephthalate fibres and cotton by the so-called thermofixation process in conjunction with reactive dyestuffs.

By using equimolecular proportions of 1,4-diamino-2-bromanthraquinone or 1,4-diamino-2-methylanthraquinone instead of 1,4-diamino-2-methoxyanthraquinone, the corresponding 2-bromo- or methyl-substituted 1-amino-4-phenylureidoanthraquinones are obtained in a good yield. These products dye polyester fibres violet tints possessing very good fastness to light when applied in the form of an aqueous dispersion.

EXAMPLE 3

A mixture of 360 parts of pyridine, 50 parts of benzene and 22.4 parts of 1-aminoanthraquinone is dehydrated azeotropically as described in Example 1. 18.6 parts of 1-naphthylisocyanate are added to the mixture dropwise at 80 to 85° C. After one hour the mixture is allowed to cool and the dyestuff is isolated by suction filtration. 32.2 parts of dyestuff are obtained in the form of a pure yellow powder. It dyes polyester fibres yellow tints possessing good properties of fastness when applied in the form of an aqueous dispersion by the thermofixation process.

Dyeing prescription 1 part of 1-amino-2-methoxy-4-phenylureidoanthraquinone and 2 parts of a 50% aqueous solution of sulphite cellulose waste liquor are ground wet and then dried.

This dyestuff preparation is mixed with 40 parts of a 10% solution of the product obtained by condensing octadecyl alcohol with 20 mols of ethylene oxide; 4 parts of a 40% acetic acid solution are then added to the mixture which is made up to 4,000 parts by diluting the mixture with water.

100 parts of a scoured polyester fibre fabric are placed in the dyebath so-obtained at 50° C., the temperature is raised to 120 to 130° C. during half an hour and dyeing is carried out at that temperature for one hour. The material is then well rinsed. A strong ruby dyeing possessing an excellent fastness to light and sublimation is obtained.

EXAMPLE 4

A mixture of 400 parts of chlorobenzene and 26.8 parts of 1,4-diamino-2-methoxyanthraquinone is heated to 130 to 135° C. in a glass apparatus as described in Example 1. Any water that may be present is removed azeotropically by distilling off about 40 parts of the chlorobenzene. 13.5 parts of butylisocyanate are added dropwise at 80 to 85° C. in about 10 minutes by means of the dropping funnel. The batch is heated to 105 to 110° C. and is stirred for six hours at that temperature. It is allowed to cool to room temperature and is then suction filtered. The dyestuff so obtained of the formula

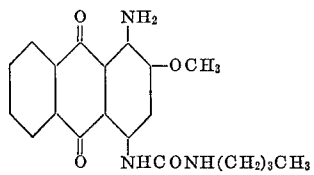

dyes polyethylene fibers strong ruby tints possessing good fastness to light and sublimation when applied in the form of an aqueous dispersion either by the high-temperature/ pressure process or at a temperature of 100° C. in the presence of a swelling agent. The dyestuff also displays a good affinity for nylon and cellulose acetate rayon.

By using 1,4-diamino-2-phenoxyanthraquinone instead of 1,4-diamino-2-methoxyanthraquinone, a dyestuff is obtained that also dyes polyester fibers ruby tints possessing excellent fastness to light and sublimation.

Dyestuffs that dye polyester fibers violet tints of excellent fastness to light and sublimation are obtained by replacing the 1,4-diamino-2-methoxyanthraquinone by 1, 4-diamino-2-methyl- or -2-chloroanthraquinone.

EXAMPLE 5

A mixture of 340 parts of xylene (isomeric mixture) and 26.8 parts of 1,4-diamino-2-methoxyanthraquinone is dehydrated azeotropically by distilling off 34 parts of the xylene. 19.2 parts of n-hexylisocyanate are added dropwise at 110 to 120° C. in the course of 10 minutes and the mixture is stirred for six hours at 120 to 125° C.

The batch is cooled to 20° C. and the dyestuff is isolated by filtration. The press cake is washed with 40 parts of xylene and any solvent present is removed by steam distillation. After filtration and drying, the pure product is obtained in a yield of 26 parts.

The dyestuff dyes polyester fibers pure pink tints possessing good fastness to light and sublimation when applied in the form of an aqueous dispersion. By using n-octylisocyanate or n-decylisocyanate instead of hexylisocyanate and proceeding as described above in the first paragraph, a dyestuff is obtained that dyes polyester fibres similar tints.

EXAMPLE 6

A mixture of 340 parts of xylene (isomeric mixtures) and 26.8 parts of 1,4-diamino-2-methoxyanthraquinone is dehydrated azeotropically by distilling off 34 parts of the xylene. 18.8 parts of cyclohexylisocyanate are added dropwise at 110 to 120° C. during 10 minutes and the batch is stirred for six hours at 130 to 135° C.

The batch is filtered at room temperature, the press cake is washed with 40 parts of xylene and then subjected to steam distillation. After suction filtration and drying at 120° C., the dyestuff is obtained in a yield of 29.9 parts. The crude product so obtained still contains about 20% of starting material as impurity. The pure dyestuff is obtained by recrystallization from chlorobenzene.

It dyes polyester fibres pure pink tints possessing good fastness to light and sublimation when applied in the form of an aqueous dispersion.

EXAMPLE 7

26.8 parts of 1,4-diamino-2-methoxyanthraquinone are reacted with 20 parts of benzylisocyanate as described in Example 5 to form 1-amino-2-methoxy-4-benzylureidoanthraquinone. The crude product is obtained in a yield of 34.5 parts. The pure dyestuff is obtained by recrystallization from nitrobenzene.

It dyes polyester fibres pure pink tints possessing good fastness to light and sublimation when applied in the form of an aqueous dispersion.

What is claimed is:
1. An anthraquinone disperse dyestuff of the formula

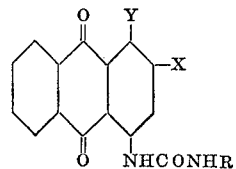

in which R represents a member selected from the group consisting of alkyl, cycloalkyl, phenyl-lower alkyl, and phenyl radicals X is a member selected from the group consisting of hydrogen and halogen atoms, lower alkyl, lower alkoxy and phenoxy groups and Y represents a member selected from the group consisting of hydroxy and amino groups.

2. An anthraquinone disperse dyestuff as claimed in claim 1 of the formula

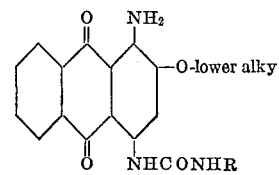

in which R is an alkyl radical containing 3 to 10 carbon atoms.

3. A dyestuff as claimed in claim 1 of the formula

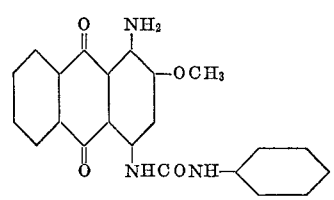

4. A dyestuff as claimed in claim 1 of the formula

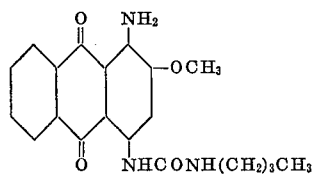

5. A dyestuff as claimed in claim 1 of the formula
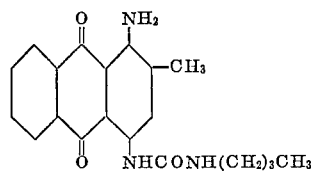
6. A dyestuff as claimed in claim 1 of the formula
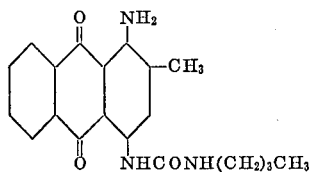
References Cited
UNITED STATES PATENTS
| 2,129,991 | 9/1938 | Deinet | 260—377 |
| 2,226,909 | 12/1940 | Peter | 260—373 XR |
| 2,155,673 | 4/1939 | Miller | 260—377 |
| 2,937,190 | 5/1960 | Straley et al. | 260—377 XR |
| 3,086,977 | 4/1963 | Turetzky | 260—384 XR |
FOREIGN PATENTS
229,111  12/1910  Germany.
LORRAINE A. WEINBERGER, *Primary Examiner.*
H. C. WEGNER, *Assistant Examiner.*
U.S. Cl. X.R.
8—39, 40; 260—376

UNITED STATES PATENT OFFICE
CERTIFICATE OF CORRECTION

Patent No. 3,433,810                                              March 18, 1969

Hans Rudolf Rickenbacher

It is certified that error appears in the above identified patent and that said Letters Patent are hereby corrected as shown below:

Column 6, lines 45 to 53, that portion of the formula reading " ———O-lower alky" should read -- ———O-lower alkyl --. Column 7, lines 6 to 9, the formula should appear as shown below:

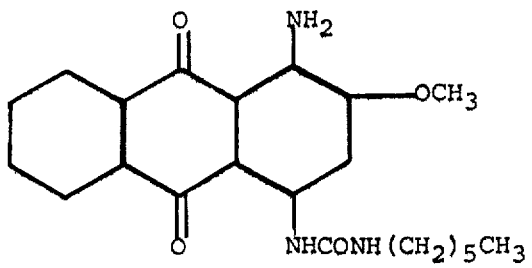

Signed and sealed this 7th day of April 1970.

(SEAL)
Attest:

EDWARD M. FLETCHER, JR.                             WILLIAM E. SCHUYLER, JR.
Attesting Officer                                             Commissioner of Patents